United States Patent [19]

Bastianelli

[11] Patent Number: 5,535,617

[45] Date of Patent: Jul. 16, 1996

[54] APPARATUS FOR LEAK TESTING WATERPROOF FOOTWEAR

[75] Inventor: Peter D. Bastianelli, Muirieston, United Kingdom

[73] Assignee: W. L. Gore & Associates (UK) Ltd., London, United Kingdom

[21] Appl. No.: 313,215

[22] PCT Filed: Mar. 29, 1993

[86] PCT No.: PCT/GB93/00641

§ 371 Date: Nov. 9, 1994

§ 102(e) Date: Nov. 9, 1994

[87] PCT Pub. No.: WO93/20437

PCT Pub. Date: Oct. 14, 1993

[30] Foreign Application Priority Data

Apr. 3, 1992 [GB] United Kingdom ............... 9207327

[51] Int. Cl.⁶ .................................................. G01M 3/04
[52] U.S. Cl. .................................................. 73/40; 73/49.8
[58] Field of Search ............................ 73/40, 49.2, 37, 73/40.7, 45.5, 49.8

[56] References Cited

U.S. PATENT DOCUMENTS

| | | | |
|---|---|---|---|
| 2,054,204 | 9/1936 | McDonald | 73/51 |
| 3,603,138 | 9/1971 | Peterson | 73/37 |
| 3,991,604 | 11/1976 | Hayes et al. | 73/37 |
| 4,799,384 | 1/1989 | Casali | 73/45.5 |

FOREIGN PATENT DOCUMENTS

| | | | |
|---|---|---|---|
| 2643713 | 8/1990 | France | 73/40 |
| 8632341 | 5/1987 | Germany . | |
| 3842392 | 6/1990 | Germany | 73/49.8 |
| 561120 | 8/1977 | U.S.S.R. . | |
| 9004772 | 5/1990 | WIPO . | |

OTHER PUBLICATIONS

U.K. and PCT International Search Reports.

Primary Examiner—Michael J. Brock
Attorney, Agent, or Firm—Gary A. Samuels

[57] ABSTRACT

A test apparatus for leak-testing waterproof footwear comprises a support post (40) and an inflatable collar (2, 43) slideably mounted thereon. A foot (48) is attached to the lower end of the post for abutting the inside sole of the footwear and spacing the collar the correct distance therefrom to seal the entrance to the footwear. The collar is inflated to seal the interior of the footwear, which is then pressurized with air. Any air leaks are detected by immersion in water and observation of bubbles, or by using a sonic probe. Almost complete footwear items can be tested, usually before application of the outer sole.

5 Claims, 2 Drawing Sheets

5,535,617

APPARATUS FOR LEAK TESTING WATERPROOF FOOTWEAR

FIELD OF THE INVENTION

The present invention relates to a test apparatus for leak-testing waterproof footwear, in particular footwear which includes a waterproof water vapour permeable breathable material such as GORE-TEX or similar material.

BACKGROUND OF THE INVENTION

Waterproof footwear including a waterproof (i.e. impermeable to liquid water) water vapour permeable membrane, such as that available under the GORE-TEX trademark, has been on the market for some time. This has been produced by first of all forming a "bootee" of a laminate of the membrane material, which can then be leak tested by immersion in water. However, it has more recently been proposed to integrate the waterproof membrane into the construction process of the shoe. In this latter case, it becomes necessary to carry out the leak testing on an assembled or partially assembled shoe, rather than a flexible bootee. There is in any case a benefit in being able to leak-test the shoe in its semi-finished state prior to application of the sole. At this stage any leaks can still be corrected. Any test apparatus must, of course, be capable of giving rapid test results in a production line environment.

U.S. Pat. No. 4,799,384 discloses a bootee testing machine wherein the entrance to the bootee is sealed by clamping together the flexible sides of the ankle portion of the bootee. This is only applicable to flexible booties and cannot be used to leak-test assembled or partially assembled shoes.

U.S. Pat. No. 4,918,981 discloses an apparatus for measuring the moisture vapour transmission rate through the sides of a shoe, which involves inserting a waterproof water-vapour-permeable liner inside the shoe, filling the liner with water and measuring the amount of water lost in a given time by transmission through the walls of the liner and the shoe.

It is an object of the present invention to provide an apparatus for leak testing waterproof footwear, which may be used on assembled or partially assembled items of footwear.

SUMMARY OF THE INVENTION

The present invention provides a test apparatus for leak-testing waterproof footwear, which comprises:

support means for passing through an entrance of the footwear;

collar means disposed around the support means in the ankle region of the footwear for sealably closing the entrance to the footwear; and means for introducing a super-atmospheric pressure of gas into the interior of the sealed footwear item.

The invention also provides a corresponding method of leak-testing.

DETAILED DESCRIPTION OF THE INVENTION

Preferably, the support means includes a foot which bears against the inside sole area of the footwear. The extension of the foot relative to the support means may be adjustable to cope with footwear items of different sizes or styles.

The collar means may be arranged so as to seal under an area of the ankle region which is tapering upwardly. In conjunction with a foot bearing against the sole of the footwear, this allows a generally upwardly directed sealing force to be applied by the collar means against the ankle region of the footwear item, thereby enhancing sealing.

Preferably, the collar means is formed of a flexible material which may be inflated under gas pressure. A duct for introducing gas pressure into the inflatable collar means is preferably included.

The means for introducing a super atmospheric pressure of gas into the interior of the sealed footwear item is preferably a further duct extending down the support means and communicating with the sealed interior of the .footwear item. The footwear is immersed in water and any leaks are indicated by bubbles of escaping gas. Alternatively a sonic probe may be used to listen for leaks.

The item of footwear may be a boot, shoe or any other waterproof item of footwear which requires testing for waterproofness.

Figure 1:
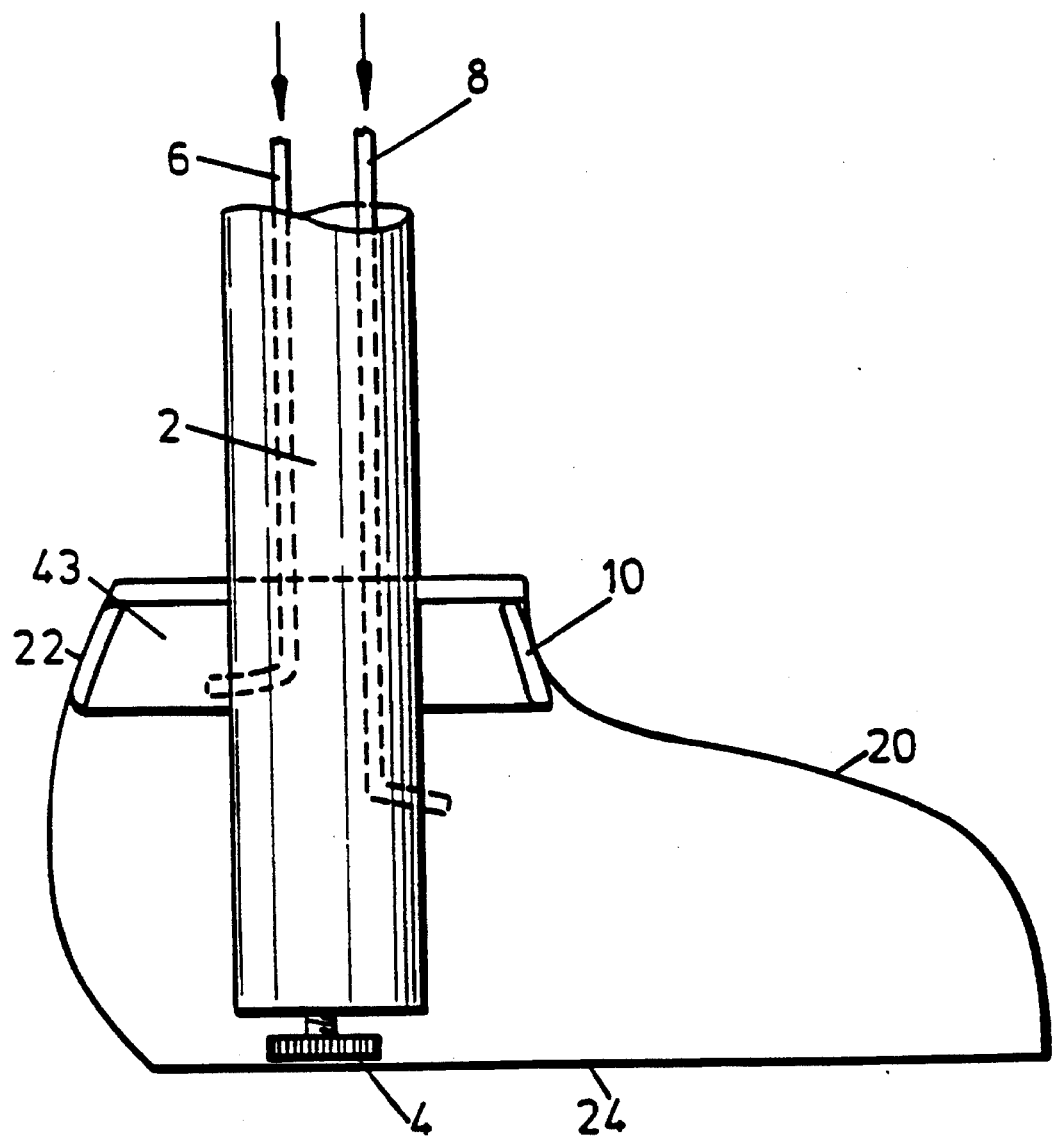
FIG. 1 shows a test apparatus inserted into a shoe for testing the waterproofness of the shoe.

The test apparatus shown in FIG. 1 comprises a hollow post 2 having an extendable foot 4 in screw threaded engagement with the bottom of the post so as to vary the effective length of the post.

Down the inside of the hollow post are passed a first pipe 6 and second pipe 8 for introducing pressurised air.

An inflatable collar in the form of a ring is attached to the outside of a cylindrical block 43 fixed to the outside of the post 2. The first pipe 6 is sealingly attached to the interior of the inflatable collar 10 to allow inflation thereof.

The second pipe 8 exits from a lower end of the post in sealing manner for introducing a test pressure of air into the interior of the shoe.

The test procedure is as follows. The test apparatus is introduced into the interior of a shoe 20 such that the adjustable foot 4 sits on the inner sole 24 of the shoe. The foot-may be adjusted so that the inflatable sleeve 20 lies in the ankle region 22 of the shoe. Air pressure is passed down the first pipe 6 so as to inflate the collar 10, so as to seal the collar against the ankle region 22 of the shoe. The collar is arranged so as to lie under an upwardly tapering part of the ankle region, so that on inflation the collar adopts an upwardly tapered configuration, as shown. In this way, force exerted between the ankle region and the sole region of the shoe also forces the inflatable collar upwardly and assists sealing engagement with the ankle region.

A test air pressure is then introduced down the second pipe 8, so as to create a super atmospheric pressure within the interior of the shoe. The shoe with the test apparatus in place is then immersed into a tank of water and any air bubbles which may indicate leakage of air from the interior of the shoe are observed. The observation of air bubbles allows any leakage points to be identified and the leakage to be rectified.

In a preferred embodiment, the post 2 is initially horizontal to allow the shoe to be mounted thereon. The collar is inflated and the post is hinged downwards to immerse the shoe in water for testing. After testing the post is hinged up again and the shoe removed. This allows rapid testing of shoes.

The shoe is generally tested in a part-assembled state before the application of the outer sole of the shoe. In this state, any leakages may be readily rectified before the outer sole is applied.

Figure 2:
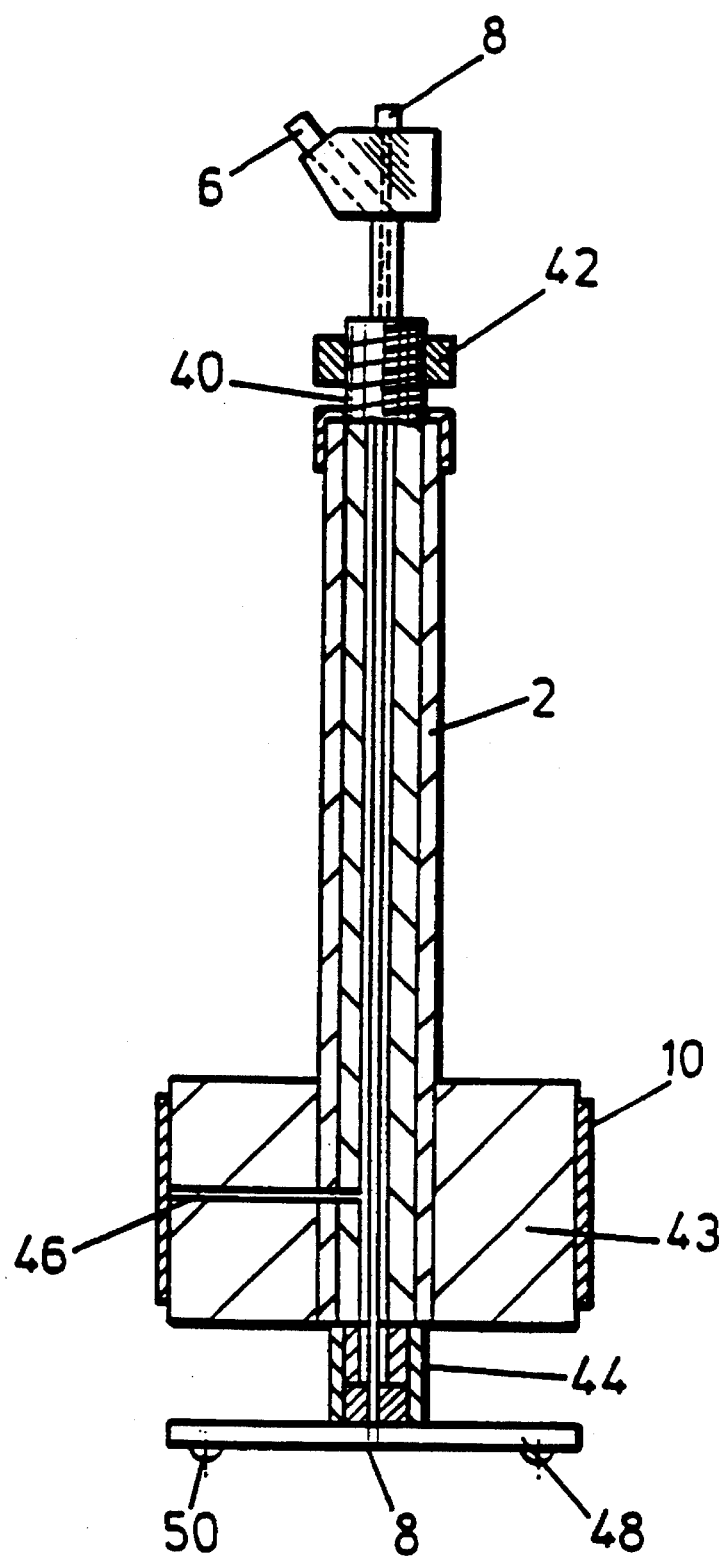
FIG. 2 shows a further embodiment.

FIG. 2 shows a further embodiment, where the same numerals are used for similar items. The hollow post 2 is a sliding fit on a threaded rod 40 and is secured by a locknut 42.

The inflatable collar 10 is adhered around the periphery of solid cylindrical block 43 of plastics material mounted on hollow post 2, and is inflated via pipe 6 and bore 46.

A foot 48 is provided at the lower end of the threaded rod and has protrusions 50 to space it above the sole of the shoe. Air pressure to pressurise the shoe is passed down pipe 8 which passes through the pipe 6.

The height of the inflatable collar is adjusted by choosing a spacer collar 44 of appropriate height, which is also supported on the threaded rod 40. The spacer collar may be changed for one of a different height by slackening the locknut 42, removing the hollow post 2, substituting a different spacer collar and reassembling.

I claim:

1. A test apparatus for leak-testing waterproof footwear, which comprises:

support means for passing through an entrance of the footwear, which support means comprises a foot at a lower end thereof, for abutting the inside sole of the footwear in use such as to space collar means a predetermined distance above the sole, the collar means disposed around the support means in the ankle region of the footwear for sealably closing an entrance to the footwear; and means for introducing a super-atmospheric pressure of gas into the interior of the sealed footwear item.

2. Apparatus according to claim 1 wherein the support means further comprises adjustment means operatively interposed between the collar means and the foot for varying said predetermined spacing distance.

3. Apparatus according to claim 2 wherein the support means is in the form of an elongate member and the collar means is movable therealong; the adjustment means comprising a replaceable spacer around the elongate support means between the foot and the collar means, and screw means for holding the collar means against the spacer.

4. Apparatus according to claim 1 wherein the collar means comprises an inflatable ring (10) disposed around the support means, and a duct (6) connected thereto for enabling inflation of the ring into sealing contact with said footwear entrance.

5. Apparatus according to claim 1 wherein the foot is provided with protrusions to raise the foot above the sole of the footwear, and said means for introducing gas passes through the support means and exits therefrom at a location on the underside of the foot.

\* \* \* \* \*